(12) United States Patent
Anneaux et al.

(10) Patent No.: US 8,178,030 B2
(45) Date of Patent: May 15, 2012

(54) ELECTROSPINNING OF PTFE WITH HIGH VISCOSITY MATERIALS

(75) Inventors: Bruce L. Anneaux, Lexington, SC (US); Robert Ballard, Orangeburg, SC (US); David P. Garner, Lexington, SC (US)

(73) Assignee: Zeus Industrial Products, Inc., Orangeburg, SC (US)

( * ) Notice: Subject to any disclaimer, the term of this patent is extended or adjusted under 35 U.S.C. 154(b) by 6 days.

(21) Appl. No.: 12/689,334

(22) Filed: Jan. 19, 2010

(65) Prior Publication Data

US 2010/0193999 A1 Aug. 5, 2010

Related U.S. Application Data

(60) Provisional application No. 61/145,309, filed on Jan. 16, 2009, provisional application No. 61/256,349, filed on Oct. 30, 2009.

(51) Int. Cl.
*D01F 6/12* (2006.01)
*D06M 10/00* (2006.01)
*H05B 7/00* (2006.01)

(52) U.S. Cl. .................. 264/465; 264/127; 264/211.12; 264/211.17; 264/234

(58) Field of Classification Search .................. 264/127, 264/211.12, 211.17, 234, 465
See application file for complete search history.

(56) References Cited

U.S. PATENT DOCUMENTS

| 2,158,416 | A | 5/1939 | Formhals | |
|---|---|---|---|---|
| 4,043,331 | A | 8/1977 | Martin et al. | 128/156 |
| 4,044,404 | A | 8/1977 | Martin et al. | 623/1.54 |
| 4,127,706 | A | 11/1978 | Martin et al. | |
| 4,143,196 | A | 3/1979 | Simm et al. | 428/212 |
| 4,287,139 | A | 9/1981 | Guignard | 264/10 |
| 4,323,525 | A | 4/1982 | Bornat | 264/441 |
| 4,432,916 | A | 2/1984 | Logan | 264/24 |
| 4,689,186 | A | 8/1987 | Bornat | 264/6 |
| 5,562,986 | A | 10/1996 | Yamamoto et al. | |
| 5,806,633 | A | 9/1998 | Macuga | |
| 5,912,077 | A | 6/1999 | Tamaru et al. | |
| 6,001,125 | A | * 12/1999 | Golds et al. | 623/23.7 |
| 6,133,165 | A | 10/2000 | Tamaru et al. | |

(Continued)

FOREIGN PATENT DOCUMENTS

GB 2 015 118 A 9/1979

(Continued)

OTHER PUBLICATIONS

Written Opinion of the International Searching Authority, PCT/US2010/021426, Aug. 12, 2010, Won Jae Lee.

(Continued)

*Primary Examiner* — Leo B. Tentoni
(74) *Attorney, Agent, or Firm* — Womble Carlyle Sandridge & Rice, LLP

(57) ABSTRACT

An improved process for forming a PTFE mat is described. The process includes providing a dispersion with PTFE, a fiberizing polymer and a solvent wherein said dispersion has a viscosity of at least 50,000 cP. An apparatus is provided which comprises a charge source and a target a distance from the charge source. A voltage source is provided which creates a first charge at the charge source and an opposing charge at the target. The dispersion is electrostatically charged by contact with the charge source. The electrostatically charged dispersion is collected on the target to form a mat precursor which is heated to remove the solvent and the fiberizing polymer thereby forming the PTFE mat.

30 Claims, 2 Drawing Sheets

U.S. PATENT DOCUMENTS

| | | |
|---|---|---|
| 6,265,333 B1 | 7/2001 | Dzenis et al. |
| 6,416,896 B1 | 7/2002 | Tamaru et al. |
| 6,641,773 B2 | 11/2003 | Kleinmeyer et al. .......... 264/452 |
| 6,743,273 B2 | 6/2004 | Chung et al. ..................... 55/482 |
| 6,790,225 B1 | 9/2004 | Shannon et al. |
| 7,083,697 B2 * | 8/2006 | Dao et al. ....................... 156/167 |
| 7,108,912 B2 | 9/2006 | Huang et al. |
| 2002/0192468 A1 | 12/2002 | Choi |
| 2004/0093070 A1 * | 5/2004 | Hojeibane et al. ........... 623/1.15 |
| 2005/0025974 A1 | 2/2005 | Lennhoff |
| 2005/0113868 A1 | 5/2005 | Devellian et al. |
| 2008/0254091 A1 | 10/2008 | Lee et al. |
| 2008/0296808 A1 * | 12/2008 | Joo et al. ........................ 264/465 |
| 2009/0233057 A1 * | 9/2009 | Aksay et al. .............. 264/465 X |
| 2010/0013126 A1 * | 1/2010 | Ishaque et al. ................. 264/465 |
| 2010/0194000 A1 | 8/2010 | Petras et al. |

FOREIGN PATENT DOCUMENTS

| | | |
|---|---|---|
| JP | 02-571379 B2 | 10/1996 |
| KR | 10-0820162 B1 | 4/2008 |
| KR | 10-0845239 B1 | 7/2008 |
| WO | WO-2008022993 A2 * | 2/2008 |

OTHER PUBLICATIONS

Notification of Transmittal of the International Search Report & The Written Opinion of the International Searching Authority, or the Declaration dated Oct. 7, 2010, from PCT Application No. PCT/US10/0044874.

Notification of Transmittal of the International Search Report & The Written Opinion of the International Searching Authority, or the Declaration dated Sep. 24, 2010, from PCT Application No. PCT/US10/0044879.

PCT International Search Report from PCT/US10/021246, dated Aug. 16, 2010.

Kim et al., "Structural Studies of Electrospun Cellulose Nanofibers," *Polymer*, 2006, pp. 5097-5107, vol. 47.

* cited by examiner

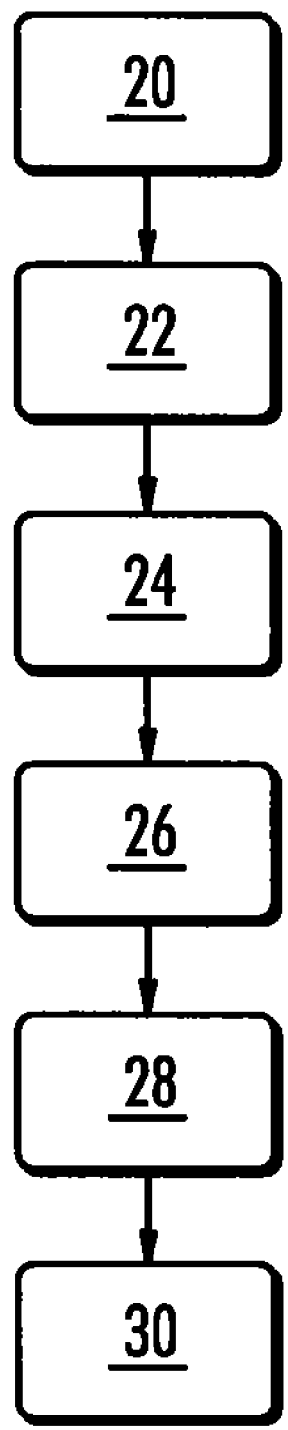

ELECTROSPINNING OF PTFE WITH HIGH VISCOSITY MATERIALS

CROSS-REFERENCE TO RELATED APPLICATIONS

The present application claims priority to pending U.S. Provisional Patent Appl. No. 61/145,309 filed Jan. 16, 2009 and to U.S. Provisional Patent Appl. No. 61/256,349 filed Oct. 30, 2009 both of which are incorporated by reference.

BACKGROUND OF THE INVENTION

The present invention is specific to a process of electrospinning polytetrafluoroethylene (PTFE). More particularly, the present invention is related to electrospinning high viscosity PTFE dispersions and products manufactured thereby.

The process of electrostatic spinning is well known in the art as represented in U.S. Pat. Nos. 2,158,416; 4,043,331; 4,143,196; 4,287,139; 4,432,916; 4,689,186; 6,641,773 and 6,743,273 each of which is incorporated herein by reference thereto. U.S. Pat. Nos. 4,323,525, 4,127,706 and 4,044,404, all of which are incorporated herein by reference, provide information related to processing and electrostatic spinning of PTFE from an aqueous or other dispersion.

Electrostatic spinning, also referred to in the art as electrospinning, involves a charged polymer moving towards a charged surface. In one embodiment the polymer is discharged through a small charged orifice, such as a needle, towards a target wherein the needle and target have opposing electrical charge. As would be realized, the nature of the polymer is critical. It has long been considered necessary in the art to maintain a relatively low viscosity of less than about 150 poise with viscosity being relatively higher for lower molecular weight polymers and relatively lower for higher molecular weight polymers. If the combination of viscosity and molecular weight were too high the fiberization was considered to be inadequate.

It has long been considered undesirable to increase the viscosity of the polymer solution over about 150 poise due to thixotropic limitations which cause orifice clogging, poor fiber formation, and the like. Furthermore, when a charged orifice is used the polymer fibers repel during flight which has long been believed to limit the number of fibers within a given volume of spray. Through diligent research the present inventors have determined, contrary to prior understandings, that a significant increase in viscosity to well above that previously considered feasible, actually improves the resulting material and provides additional properties and advantages not previously considered possible.

SUMMARY OF THE INVENTION

It is an object of the invention to provide an improved process for electrospinning PTFE.

It is another object of the invention to provide a method to provide superior products based on electrospun PTFE.

A particular feature of the present invention is the ability to utilize existing electrospinning techniques, and facilities, while providing an improved product.

These and other advantages, as will be realized, are provided in a process for forming a PTFE mat. The process includes providing a dispersion with PTFE, a fiberizing polymer and a solvent wherein said dispersion has a viscosity of at least 50,000 cP. An apparatus is provided which comprises a charge source and a target a distance from the charge source. A voltage source is provided which creates a first charge at the charge source and an opposing charge at the target. The dispersion is electrostatically charged by contact with the charge source. The electrostatically charged dispersion is collected on the target to form a mat precursor which is heated to remove the solvent and the fiberizing polymer thereby forming the PTFE mat.

Yet another advantage is provided in a process for forming a PTFE mat. The process includes providing a dispersion comprising PTFE with a particle size of at least 0.1 microns to no more than 0.8 microns; 1 wt % to no more than 10 wt % of polyethylene oxide with a molecular weight of at least 50,000 to no more than 4,000,000; and a solvent wherein said dispersion has a viscosity of at least 50,000 cP. An apparatus is provided comprising an orifice and a target a distance from the orifice. A voltage source is provided to create a first charge at the orifice and an opposing charge at the target. The dispersion is forced through the orifice wherein the dispersion is electrostatically charged by contact with the orifice. Electrostatically charged dispersion is collected on the target to form a mat precursor which is heated to remove the solvent and the fiberizing polymer thereby forming the PTFE mat.

BRIEF DESCRIPTION OF THE FIGURES

FIG. 2 schematically illustrates the inventive process.

DETAILED DESCRIPTION

Figure 1:
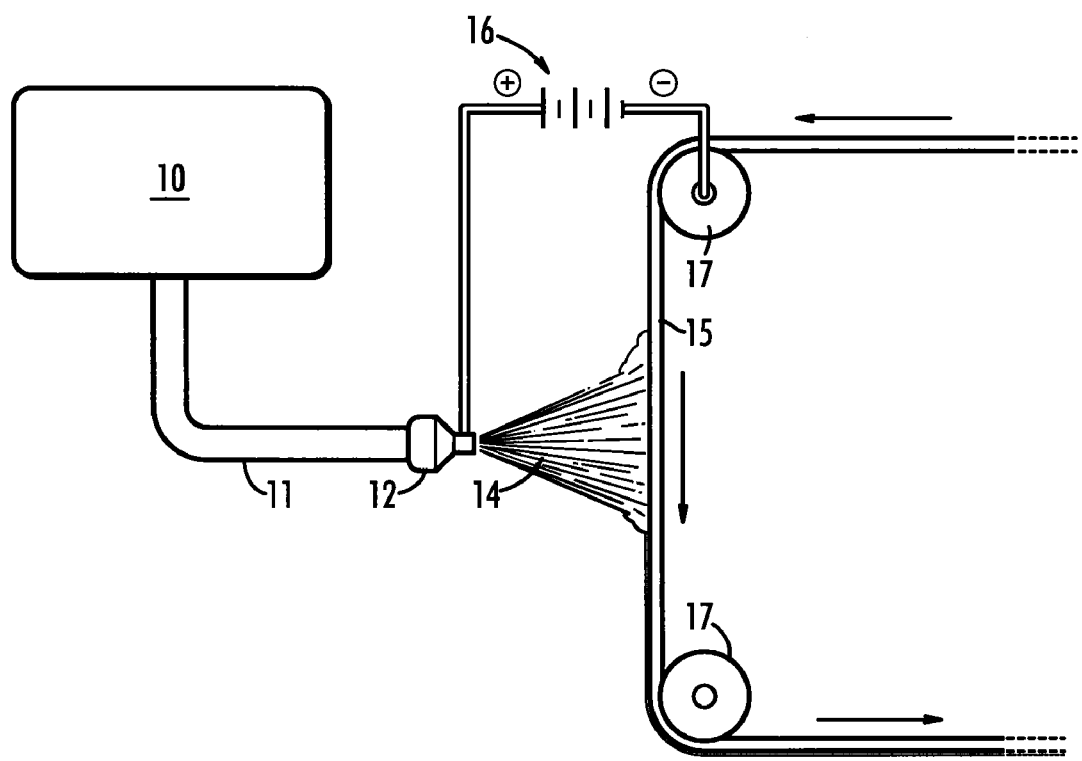
FIG. 1 schematically illustrates electrodeposition.

The present invention is directed to a process for the electrostatic spinning of polytetrafluoroethylene (PTFE) into continuous fibers for the formation of non-woven sheets, membranes, tubes, and coatings with potential for multiple other applications and forms. In particular, the present invention is directed to electrospinning PTFE at a very high viscosity relative to the prior art in direct contrast to that which was previously considered feasible.

An electrostatic spinning apparatus is illustrated schematically in FIG. 1. In FIG. 1 a reservoir, 10, is loaded with a high viscosity dispersion as further described herein. A delivery system, 11, delivers the dispersion from the reservoir to a charge source, 12, which may be an orifice. A target, 15, is set some distance from the charge source, 12. A power source, 16, such as a DC power supply establishes an electrical charge differential between the charge source and target such that polymeric material, 14, is electrically charged opposite the target. The polymeric material is electrostatically attracted to the target and is deposited thereon. The target may be static, in motion or it may be a continuous, or near continuous, material which moves through the zone of polymer impact, such as by movement on transport rollers, 17, or the like. In one embodiment the electrical charge, or ground as illustrated, is applied to the roller which is in electrically conductive contact with the target. The target may be a continuous loop or it may initiate on a delivery device, such as a supply spool and be taken up by a collector, such as a receiver spool. In an alternative embodiment the charge source and target may be in a common dispersion bath.

The instant process requires a dispersion or suspension of a sufficient percentage of PTFE solids to aid in the post processing of the collected fibrous mat into a form that has some mechanical integrity. If the PTFE solid content in the dispersion is too low, there will be no, or poor, mechanical integrity to the resulting material. Second, the selection of the polymer used to increase the viscosity of the solution, suspension or dispersion, also referred to as a fiberization polymer, to be spun must be selected carefully. We have found that too low of a molecular weight fiberization polymer added to the PTFE will cause poor performance and poor handling characteristics. It is also believed that too high of a molecular weight will cause an increase in the viscosity without enough of the polymer being present to actually bind the PTFE powder together during the electrospinning and curing process. Additionally, the process used to sinter the PTFE powder together must be finely controlled such that the resulting product has good mechanical integrity.

It is preferred that the PTFE have a molecular weight of $10^6$ to $10^8$.

It is preferred that the PTFE have a particle size of at least 0.1 microns to no more than 0.8 microns. More preferably, the PTFE has a particle size of at least 0.2 microns to no more than 0.6 microns. Below a particle size of 0.1 microns the materials create manufacturing difficulties. Above a particle size of 0.8 microns the particle size approaches the target fiber diameter and becomes a defect in the fiber. For other applications larger sizes may be suitable for use.

The process for producing a non-woven PTFE material will be described with reference to FIG. 2. An aqueous dispersion of a narrow particle size distribution PTFE powder is prepared, 20. A fiberizing polymer is added, 22, to the dispersion. Preferably, the fiberizing polymer is added in an amount of between 1 and 10 wt %, more preferably about 2 to 7 wt % with about 4-5 wt % being most preferred. The fiberizing polymer preferably has a high solubility in the solvent, which is preferably water, with a solubility of greater than about 0.5 wt % being preferred. It is preferable that the fiberizing polymer has an ash content of less than about 5 wt %, when sintered at about 400° C., with even lower being more preferred.

Particularly preferred fiberization polymers include dextran, alginates, chitosan, guar gum compounds, starch, polyvinylpyridine compounds, cellulosic compounds, cellulose ether, hydrolyzed polyacrylamides, polyacrylates, polycarboxylates, polyvinyl alcohol, polyethylene oxide, polyethylene glycol, polyethylene imine, polyvinylpyrrolidone, polyacrylic acid, poly(methacrylic acid), poly(itaconic acid), poly(2-hydroxyethyl acrylate), poly(2-(dimethylamino)ethyl methacrylate-co-acrylamide), poly(N-isopropylacrylamide), poly(2-acrylamido-2-methyl-1-propanesulfonic acid), poly(methoxyethylene), poly(vinyl alcohol), poly(vinyl alcohol) 12% acetyl, poly(2,4-dimethyl-6-triazinylethylene), poly(3-morpholinylethylene), poly(N-1,2,4-triazolyethylene), poly(vinyl sulfoxide), poly(vinyl amine), poly(N-vinyl pyrrolidone-co-vinyl acetate), poly(g-glutamic acid), poly(N-propanoyliminoethylene), poly(4-amino-sulfo-aniline), poly[N-(p-sulphophenyl)amino-3-hydroxymethyl-1,4-phenyleneimino-1,4-phenylene)], isopropyl cellulose, hydroxyethyl, hydroxylpropyl cellulose, cellulose acetate, cellulose nitrate, alginic ammonium salts, i-carrageenan, N-[(3'-hydroxy-2',3'-dicarboxy)ethyl]chitosan, konjac glocomannan, pullulan, xanthan gum, poly(allyammonium chloride), poly(allyammonium phosphate), poly(diallydimethylammonium chloride), poly(benzyltrimethylammonium chloride), poly(dimethyldodecyl(2-acrylamidoethyly) ammonium bromide), poly(4-N-butylpyridiniumethylene iodine), poly(2-N-methylpridiniummethylene iodine), poly(N methylpryidinium-2,5-diylethenylene), polyethylene glycol polymers and copolymers, cellulose ethyl ether, cellulose ethyl hydroxyethyl ether, cellulose methyl hydroxyethyl ether, poly(1-glycerol methacrylate), poly(2-ethyl-2-oxazoline), poly(2-hydroxyethyl methacrylate/methacrylic acid) 90:10, poly(2-hydroxypropyl methacrylate), poly(2-methacryloxyethyltrimethylammonium bromide), poly(2-vinyl-1-methylpyridinium bromide), poly(2-vinylpyridine N-oxide), poly(2-vinylpyridine), poly(3-chloro-2-hydroxypropyl-2-methacryloxyethyldimethylammonium chloride), poly(4-vinylpyridine N-oxide), poly(4-vinylpyridine), poly(acrylamide/2-methacryloxyethyltrimethylammonium bromide) 80:20, poly(acrylamide/acrylic acid), poly(allylamine hydrochloride), poly(butadiene/maleic acid), poly(diallyldimethylammonium chloride), poly(ethyl acrylate/acrylic acid), poly(ethylene glycol) bis(2-aminoethyl), poly(ethylene glycol) monomethyl ether, poly(ethylene glycol)-bisphenol A diglycidyl ether adduct, poly(ethylene oxide-b-propylene oxide), poly(ethylene/acrylic acid) 92:8, poly(1-lysine hydrobromide), poly(1-lysine hydrobromide), poly(maleic acid), poly(n-butyl acrylate/2-methacryloxyethyltrimethylammonium bromide), poly(N-iso-propylacrylamide), poly(N-vinylpyrrolidone/2-dimethylaminoethyl methacrylate), dimethyl sulfatequaternary, poly(N-vinylpyrrolidone/vinyl acetate), poly(oxyethylene) sorbitan monolaurate (Tween 20®), poly(styrenesulfonic acid), poly(vinyl alcohol), N-methyl-4(4'-formylstyryl)pyridinium, methosulfate acetal, poly(vinyl methyl ether), poly(vinylamine) hydrochloride, poly(vinylphosphonic acid), poly(vinylsulfonic acid) sodium salt and polyaniline.

A particularly preferred fiberizing polymer is polyethyleneoxide (PEO) with a molecular weight of 50,000-4,000,000 and more preferably a molecular weight of about 250,000 to 350,000 and most preferably a molecular weight of about 300,000.

With further reference to FIG. 2, after mixing the PTFE and fiberizing polymer dispersion is preferably allowed to homogenize, 24. In a particularly preferred method the polymer dispersion is allowed to form slowly, without agitation, followed by transfer to a jar roller that will turn it at a constant rate for several more days. It is preferred to create a uniform dispersion that has little to no air trapped in the resulting highly viscous mixture. Once the dispersion is of uniform consistency it is preferably filtered to remove any clumps or gels. The filtered dispersion with the desired viscosity is then loaded, 26, in a controlled pumping device with a fixed conductive element which acts as the charge source. A particularly preferred conductive element is an orifice such as a 16 gauge needle that has been cut blunt and sanded to remove any burs. The ejection volume from the pumping device is set to a predetermined rate that is dependent on the form being made and the desired fiber diameters. The charge source is preferably connected to the positive side of a precision DC power supply. The negative side of the power supply is preferably connected to the collection surface or target. The polarity can be reversed but this is not preferred.

The target surface can be a drum, device or sheet. The surface can be a metal, ceramic or polymeric material with particularly preferred materials selected from stainless steel, cobalt chrome, nickel titanium (nitinol), magnesium alloys polyactides, polyglycolides, polyhydroxyl butyrates, polyhydroxyalkynoates, polydioxinine, polyetheretherketone (PEEK), polyurethanes, polycarbonates and polyethyleneoxide. The voltage on the power supply is increased to the desired voltage to uniformly draw out the polymer/PTFE dispersion.

The applied voltage is typically from 2,000-80,000 volts. The charge induced by the connection of the power supply repels the charged polymer away from the charge source and attracts them to the collection surface.

The collection target is preferably placed perpendicular to the pump and orifice system and is moved in at least one direction such that the entire surface is uniformly covered, 28, with the fibers drawn towards the target. Once the collection surface has been adequately covered the material is preferably cured/sintered, 30, either in place, by placing the entire collection surface in an oven, or by removing the sheet tube or other form from the collection surface and sintering it in an oven.

Electrospun PTFE fabrics undergo shrinkage upon sintering. While not limited to any theory the shrinkage is believe to occur in two steps. Initially, the fibers and fabrics, as spun, contain both water and a fiberizing polymer, preferably polyethyleneoxide. Upon completion of spinning the samples dry and undergo a small degree of fiber rearrangement. The samples are sintered by exposing the fibers and fabrics to temperatures of 550° to 900° F. for a period of time such that the water and fiberizing polymer are evaporated. The evaporation is hypothesized to generate a second, more significant, shrinkage. Cracking of the fabric and breaking of the fibers is believed to occur during this second shrinkage when the fabric has not been allowed to relax.

To accommodate for shrinkage, the fiber and fabrics can be spun onto an expanded structure. The structure can then be removed or contracted. This allows the fabric to shrink during sintering without cracking. Another method involves spinning the fibers and fabrics onto a structure which can then be expanded or contracted prior to sintering. The range of contraction or expansion and contraction is preferably on the order of 3 to 100% and depends upon the thickness and size of the electrodeposited fabric mat.

For a sheet of fabric, if the direction of the deposition is given as the perpendicular to the plane of the fabric then contraction or expansion/contraction must occur in at least one or more of the directions in the plane of the fabric. For a fabric deposited upon a cylindrical surface the fabric must be contracted or contracted/expanded radially and/or longitudinally. For a spherical surface the fabric must be contracted or contracted/expanded radially. These basic concepts of contraction and/or expansion/contraction can be applied to any electrospun fabric independent of the shape of the surface upon which it was spun. Thus, very complex fabric shapes based upon PTFE fabric become possible.

In a particularly preferred embodiment a high viscosity material is used. It is surprising that superior properties are observed by electrospinning a material with a viscosity of at least 50,000 cP to no more than 300,000 cP. More preferably the viscosity is at least 100,000 cP to no more than 250,000 and most preferably the viscosity is at least 150,000 cP no more than 200,000 cP. Above a viscosity of 300,000 cP it becomes increasingly difficult to generate a fiber.

In one embodiment electrospinning dispersions are based upon Daikin D 210 PTFE and Sigma Aldrich polyethylene oxide with a molecular weight of 300,000. Daikin D 210 PTFE is representative of a material suitable for demonstrating the invention. Daikin D 210 PTFE has about 59-62 wt % solids, 6.0-7.2% wt % surfactant, a pH of 8.5 to 10.5, a specific gravity of 1.5 to 1.53 and a Brookfield viscosity maximum of 35 cP.

The dispersion has a preferred PTFE percent solids, by weight, of 50%-80%, more preferably 55-65 wt %, and even more preferably 59-61 wt %. The specific gravity is preferably 1.5 to 1.54 and more preferably 1.51. By way of example, a 1000 ml dispersion would have a weight range of 1500 gm to 1530 gm with 885 gm to 933.3 gm of PTFE.

A particularly preferred embodiment has 60% PTFE solids, a specific gravity of 1.51, with 909 gm of PTFE per 1000 ml of dispersion.

A particularly preferred example is prepared with from 32 gm to 52 gm fiberizing polymer, most preferably PEO, per 1000 ml of the Daikin D 210 dispersion which provides a ratio of fiberizing polymer solids to PTFE dispersion (such as PEO/PTFE) of from 0.032 to 0.052 gm/ml PEO in the 1000 ml of dispersion. Fiberizing polymer ratios, below 0.03 gm/ml by weight, results in very poor quality and non-uniform fiber mat formation. Poor quality is defined as the existence of high levels of fiber breakage, >20%, and the formation of non-uniform fiber diameters which are also referred to in the art as "beading". The existence of broken fibers and/or non-uniform fibers results in non-uniform porosity within the fibrous mat. The presence of broken fibrils, especially short fibrils, leads to decreased efficiency over time as the non-continuous fibrils are pulled from the mat.

A PTFE dispersion of 60% PTFE solids and PEOs ranging between 200,000 and 4,000,000 Mw is representative. Fiberizing polymer to PTFE ranges of 0.03 to 0.06 for fiberizing polymer being PEO with a molecular weight of 300,000 is particularly representative.

Viscosities for different formulations of PEO/PTFE at a constant spindle speed setting of 2.5 for a #25 spindle at 25° C. taken in a Brookfield LV Viscometer are provided in Table 1.

TABLE 1

| Sample | Torque (%) | Viscosity (cp) |
|---|---|---|
| 0.052 gm/ml PEO | 88.5 | 171,000 |
| 0.048 gm/ml PEO | 76.8 | 147,000 |
| 0.044 gm/ml PEO | 79.2 | 152,000 |
| 0.040 gm/ml PEO | 58.5 | 112,000 |
| 0.036 gm/ml PEO | 40.1 | 77,000 |
| 0.032 gm/ml PEO | 34.5 | 66,000 |

Assuming 909 gm PTFE in 1000 ml of the Diakin D 210 dispersion the preferred percent PEO/PTFE dispersion range is from 0.032 to 0.060 gm/ml. About 0.048 gm/ml is particularly preferred for demonstrating the invention.

For deposition a charged needle and a grounded target is preferred and relied on herein unless otherwise specified. This has been accepted as a standard practice within the industry partially for safety reasons. A grounded needle and a charged target can be used but this is not preferred since the result is inferior material.

Voltages of 11, 14, or 17 kV with corresponding distances from tip to top of target (TTT) of 4.5", 5.5", and 6.5" were relied on for convenience for the samples set forth herein. Voltages and distances are design choices based on experimental apparatus employed the determination of which is well known to those of skill in the art. For the purposes of demonstration, samples were deposited onto foil, dried and then sintered at 725° F. for five minutes then examined by SEM. The process produced a smooth, heavy, wide web indicating a significant improvement in material transfer efficiency. Test results using reverse polarity were inferior. A mat was deposited that was about 5" wide.

Visual observation showed various levels of degradation in samples produced by reverse polarity. In addition, the photomicrographs showed breakage of fibers as well as a twisting of fibers to create fiber bundles. There was also a wide distribution of fiber and fiber bundle diameters. All of these fiber characteristics will result in an inconsistent and poor quality fiber mat. These fiber characteristics are consistent with poor fiber mat quality observed with our attempts to espin from low PEO/PTFE concentration dispersions. High voltages and tip-to-target distances 5.5 and 6.5", showed the most fiber breakage whereas the 4.5" TTT distance showed the most bundling.

When "normal" e-spun PTFE was examined under high magnification there was no apparent fiber breakage, all fibers were of uniform diameter and fiber mats survived the sintering process.

Representative results are provided in Tables 2-4 with standard deviations reported in parenthesis. In the Tables the air flow, pore diameter, and bubble point were measured using a Porous Materials, Inc. Capillary Flow Porometer Model CFP-1100-AEXL using test type "Dry Up/Wet Up". Density was measured by a gas pycnometer using ISO 1183-3. Tensile, elongation, and modulus were measured using ASTM D882 with diecut ASTM D638 Type V dogbone sample geometry. Viscosities for different formulations of PEO/PTFE were done at the constant spindle speed setting listed for a #25 spindle at 25° C. taken in a Brookfield LV Viscometer.

A particular advantage offered by the present process is that the resulting material has significantly fewer broken fibrils upon sintering than a sample of the prior art. A decrease in fibril breakage increases manufacturing productivity due to a decrease in the material which is inferior. This is achieved without a loss of product characteristics.

The invention has been described with reference to the preferred embodiments without limit thereto. One of skill in the art would realize additional embodiments and improvements which are within the meets and bounds of the invention which are more specifically set forth in the claims appended hereto.

TABLE 2

Physical Properties of PTFE Membranes 60% PTFE, 0.048 gm/ml PEO/1000 ml PTFE dispersion.

| Examples | 1 | 2 | 3 | 4 | 5 |
|---|---|---|---|---|---|
| Viscosity (cP) | 147,000 | 147,000 | 147,000 | 147,000 | 147,000 |
| Thickness (mil) | 0.2 (0.08) | 0.5 (0.05) | 1.1 (0.24) | 1.02 | 3.33 |
| Spindle setting | 2.5 | 2.5 | 2.5 | 2.5 | 2.5 |
| Density (g/cm3) | 0.3549 | 0.3227 | 0.4342 | | 0.4239 |
| Basis Weight (g/cm2) | 2.9605 | 8.0807 | 10.773 | 33.7 | 35.888 |
| BP: Pore diameter (microns) | 9.17 (0.787) | 3.18 (0.157) | 3.01 (0.123) | 3.41 (0.235) | 2.63 (0.088) |
| Bubble point: Pressure (psi) | 0.72 (0.062) | 2.08 (0.102) | 2.2 (0.089) | 1.94 (0.138) | 2.52 (0.082) |
| Air Flow (micron) | | | | 1.4217 | |
| Density (g/cm3) | | 2.0871 | 2.2334 | 2.2022 | 2.2255 | 2.1985 |
| Tensile Strength (psi) | 190 (58.1) | 339 (15) | 348 (86.9) | 1450 (290) | 208 (19.9) |
| Modulus (psi) | 1420 (395) | 1560 (45.8) | 1910 (143) | 3650 (1100) | 1594 (235) |
| Elongation (%) | 110 (23) | 190 (13) | 140 (28) | 255 (38) | 130 (14.6) |

TABLE 3

Physical Properties of PTFE Membranes 67% PTFE, 0.015 to 0.040 gm/ml PEO/1000 ml PTFE dispersion.

| Examples | 6 | 7 | 8 | 9 | 10 |
|---|---|---|---|---|---|
| Viscosity (cP) | 129,000 | | | 249,000 | <500,000 |
| Spindle setting | 2.5 | 2.5 | 2.5 | 2.0 | 2.5 |
| PEO/PTFE (g/ml) | 0.015 | 0.02 | 0.025 | 0.030 | 0.040 |
| Thickness (mil) | 2.7 | 2.2 | 2.5 | 1.5 | 1.0 |
| Density (g/cm3) | 0.4949 | 0.5973 | 0.5331 | 0.3854 | 0.2521 |
| Basis Weight (g/cm2) | 18.745 | 12.385 | 24.371 | 12.767 | 4.681 |
| BP: Pore diameter (microns) | 4.14 | 3.95 | 5.09 | 4.05 | 6.7 |
| Bubble point: Pressure (psi) | 1.59 | 1.68 | 1.30 | 1.63 | 0.935 |
| Air Flow (micron) | 1.4806 | 1.5747 | 1.9938 | 1.8346 | 3.0425 |
| Density (g/cm3) | 2.2139 | 2.1978 | 2.2077 | 2.1904 | |
| Tensile Strength (psi) | 371.37 | 626.76 | 321 | 109 | 114.47 |
| Modulus (psi) | 2430 | 3381.8 | 1380 | 2300 | 1220 |
| Elongation (%) | 106.33 | 114.27 | 126.77 | 121.92 | 68 |

TABLE 4

Physical Properties of PTFE Membranes 72% PTFE, 0.020 to 0.030 gm/ml PEO/1000 ml PTFE dispersion.

| Examples | 11 | 12 | 13 |
|---|---|---|---|
| PEO/PTFE (g/ml) | 0.02 | 0.025 | 0.030 |
| Thickness (mil) | 1.8 | 2.3 | 1.5 |
| Density (g/cm3) | 0.3504 | 0.2972 | 0.4110 |
| Basis Weight (g/cm2) | 13.795 | 13.320 | 10.442 |
| BP: Pore diameter (microns) | 7.14 | 9.15 | 5.7223 |
| Bubble point: Pressure (psi) | 0.92 | 0.76 | 1.09 |
| Air Flow (micron) | 3.3837 | 3.1946 | 2.6542 |
| Density(g/cm3) | 2.2236 | 2.1845 | 2.2182 |
| Tensile Strength (psi) | 218.57 | 103.99 | 335 |
| Modulus (psi) | 1610 | 764 | 2790 |
| Elongation (%) | 86.42 | 48 | 110 |

The invention claimed is:

1. A process for forming a PTFE mat comprising:
providing a dispersion comprising:
   PTFE;
   a fiberizing polymer; and
   a solvent wherein said dispersion has a viscosity of at least 50,000 cP;
providing an apparatus comprising a charge source and a target a distance from said charge source;
providing a voltage source to create a first charge at said charge source and an opposing charge at said target wherein said dispersion is electrostatically charged by contact with said charge source;
collecting said electrostatically charged dispersion on said target to form a mat precursor; and
heating said mat precursor to remove said solvent and said fiberizing polymer thereby forming said PTFE mat.

2. The process for forming a PTFE mat of claim 1 wherein said dispersion comprises 50-80 wt % PTFE solids.

3. The process for forming a PTFE mat of claim 2 wherein said dispersion comprises 59-61 wt % PTFE solids.

4. The process for forming a PTFE mat of claim 1 further comprising sintering.

5. The process for forming a PTFE mat of claim 4 wherein said sintering is at a temperature of at least 500° F. to no more than 900° F.

6. The process for forming a PTFE mat of claim 1 wherein said dispersion has a viscosity of at least 100,000 cP to no more than 300,000 cP.

7. The process for forming a PTFE mat of claim 1 comprising providing a voltage of 2,000 to 80,000 volts across said orifice and said target.

8. The process for forming a PTFE mat of claim 1 wherein said dispersion comprises at least 1 wt % to no more than 10 wt % of said fiberizing polymer.

9. The process for forming a PTFE mat of claim 1 wherein said dispersion comprises a weight ratio of fiberizing polymer to PTFE of at least 3.0 to no more than 5.5.

10. The process for forming a PTFE mat of claim 1 wherein said fiberizing polymer has a solubility in said solvent of greater than 0.5 wt %.

11. The process for forming a PTFE mat of claim 1 wherein said solvent is water.

12. The process for forming a PTFE mat of claim 1 wherein said fiberizing polymer has an ash content of less than 5 wt % upon sintering at 400° C.

13. The process for forming a PTFE mat of claim 1 wherein said fiberizing polymer is selected from the group consisting of dextran, alginates, chitosan, guar gum compounds, starch, polyvinylpyridine compounds, cellulosic compounds, cellulose ether, hydrolyzed polyacrylamides, polyacrylates, polycarboxylates, polyvinyl alcohol, polyethylene oxide, polyethylene glycol, polyethylene imine, polyvinylpyrrolidone, polyacrylic acid, poly(methacrylic acid), poly(itaconic acid), poly(2-hydroxyethyl acrylate), poly(2-(dimethylamino)ethyl methacrylate-co-acrylamide), poly(N-isopropylacrylamide), poly(2-acrylamido-2-methyl-1-propanesulfonic acid), poly(methoxyethylene), poly(vinyl alcohol), poly(vinyl alcohol) 12% acetyl, poly(2,4-dimethyl-6-triazinylethylene), poly(3-morpholinylethylene), poly(N-1,2,4-triazolyethylene), poly(vinyl sulfoxide), poly(vinyl amine), poly(N-vinyl pyrrolidone-co-vinyl acetate), poly(g-glutamic acid), poly(N-propanoyliminoethylene), poly(4-amino-sulfo-aniline), poly[N-(p-sulphophenyl)amino-3-hydroxymethyl-1,4-phenyleneimino-1,4-phenylene)], isopropyl cellulose, hydroxyethyl, hydroxylpropyl cellulose, cellulose acetate, cellulose nitrate, alginic ammonium salts, i-carrageenan, N-[(3'-hydroxy-2',3'-dicarboxy)ethyl]chitosan, konjac glocomannan, pullulan, xanthan gum, poly(allyammonium chloride), poly(allyammonium phosphate), poly(diallydimethylammonium chloride), poly(benzyltrimethylammonium chloride), poly(dimethyldodecyl(2-acrylamidoethylyl) ammonium bromide), poly(4-N-butylpyridiniumethylene iodine), poly(2-N-methylpridiniummethylene iodine), poly(N methylpryidinium-2,5-diylethenylene), polyethylene glycol polymers and copolymers, cellulose ethyl ether, cellulose ethyl hydroxyethyl ether, cellulose methyl hydroxyethyl ether, poly(1-glycerol methacrylate), poly(2-ethyl-2-oxazoline), poly(2-hydroxyethyl methacrylate/methacrylic acid) 90:10, poly(2-hydroxypropyl methacrylate), poly(2-methacryloxyethyltrimethylammonium bromide), poly(2-vinyl-1-methylpyridinium bromide), poly(2-vinylpyridine N-oxide), poly(2-vinylpyridine), poly(3-chloro-2-hydroxypropyl-2-methacryloxyethyldimethylammonium chloride), poly(4-vinylpyridine N-oxide), poly(4-vinylpyridine), poly(acrylamide/2-methacryloxyethyltrimethylammonium bromide) 80:20, poly(acrylamide/acrylic acid), poly(allylamine hydrochloride), poly(butadiene/maleic acid), poly(diallyldimethylammonium chloride), poly(ethyl acrylate/acrylic acid), poly(ethylene glycol) bis(2-aminoethyl), poly(ethylene glycol) monomethyl ether, poly(ethylene glycol)-bisphenol A diglycidyl ether adduct, poly(ethylene oxide-b-propylene oxide), poly(ethylene/acrylic acid) 92:8, poly(1-lysine hydrobromide), poly(1-lysine hydrobromide), poly(maleic acid), poly(n-butyl acrylate/2-methacryloxyethyltrimethylammonium bromide), poly(N-iso-propylacrylamide), poly(N-vinylpyrrolidone/2-dimethylaminoethyl methacrylate), dimethyl sulfatequaternary, poly(N-vinylpyrrolidone/vinyl acetate), poly(oxyethylene) sorbitan monolaurate, poly(styrenesulfonic acid), poly(vinyl alcohol), N-methyl-4(4'-formylstyryl)pyridinium, methosulfate acetal, poly(vinyl methyl ether), poly(vinylamine) hydrochloride, poly(vinylphosphonic acid), poly(vinylsulfonic acid) sodium salt and polyaniline.

14. The process for forming a PTFE mat of claim 13 wherein said fiberizing polymer is polyethylene oxide.

15. The process for forming a PTFE mat of claim 14 wherein said polyethylene oxide has a molecular weight of at least 50,000 to no more than 4,000,000.

16. The process for forming a PTFE mat of claim 1 wherein said target is an expanded structure.

17. The process for forming a PTFE mat of claim 1 further comprising expanding or contracting said target.

18. The process for forming a PTFE mat of claim 1 further comprising expanding or contracting said target prior to said collecting.

19. A process for forming a PTFE mat comprising:
providing a dispersion comprising:
PTFE with a particle size of at least 0.1 microns to no more than 0.8 microns;
1 wt % to no more than 10 wt % of polyethylene oxide with a molecular weight of at least 50,000 to no more than 4,000,000; and
a solvent wherein said dispersion has a viscosity of at least 50,000 cP;
providing an apparatus comprising an orifice and a target a distance from said orifice;
providing a voltage source to create a first charge at said orifice and an opposing charge at said target;
forcing said dispersion through said orifice wherein said dispersion is electrostatically charged by contact with said orifice;
collecting said electrostatically charged dispersion on said target to form a mat precursor; and
heating said mat precursor to remove said solvent and said fiberizing polymer thereby forming said PTFE mat.

20. The process for forming a PTFE mat of claim 1 wherein said dispersion has a viscosity of at least 100,000 cP to no more than 500,000 cP.

21. The process for forming a PTFE mat of claim 6 wherein said viscosity is measured with a Brookfield LV Viscometer at a constant spindle speed setting of 2.5 for a #25 spindle at 25° C.

22. The process for forming a PTFE mat of claim 20 wherein said viscosity is measured with a Brookfield LV Viscometer at a constant spindle speed setting of 2.5 for a #25 spindle at 25° C.

23. A process for forming a PTFE mat comprising:
applying a voltage to establish an electrical charge differential between a charge source and a target;
electrostatically charging a dispersion, wherein the dispersion is electrostatically charged by the charge source, wherein the dispersion comprises PTFE, a fiberizing polymer, and a solvent, and wherein the dispersion has a viscosity of at least 50,000 cP;
collecting the electrostatically charged dispersion on the target, forming a mat precursor; and
heating the mat precursor to remove the solvent and the fiberizing polymer thereby forming the PTFE mat.

24. The process for forming a PTFE mat of claim 23, wherein said dispersion has a viscosity of at least 100,000 cP to no more than 300,000 cP.

25. The process for forming a PTFE mat of claim 23, wherein said dispersion has a viscosity of at least 100,000 cP to no more than 500,000 cP.

26. The process for forming a PTFE mat of claim 24, wherein said viscosity is measured with a Brookfield LV Viscometer at a constant spindle speed setting of 2.5 for a #25 spindle at 25° C.

27. The process for forming a PTFE mat of claim 25, wherein said viscosity is measured with a Brookfield LV Viscometer at a constant spindle speed setting of 2.5 for a #25 spindle at 25° C.

28. A process for forming a PTFE mat comprising:
applying a voltage to establish an electrical charge differential between a charge source and a target;
electrostatically charging a dispersion, wherein the dispersion is electrostatically charged by the charge source, wherein the dispersion comprises
PTFE with a particle size of at least 0.1 microns to no more than 0.8 microns,
1 wt % to no more than 10 wt % of polyethylene oxide with a molecular weight of at least 50,000 to no more than 4,000,000, and
a solvent,
wherein said dispersion has a viscosity of at least 50,000 cP;
collecting said electrostatically charged dispersion on said target, forming a mat precursor; and
heating said mat precursor to remove said solvent and said fiberizing polymer thereby forming said PTFE mat.

29. The process for forming a PTFE mat of claim 19 wherein said dispersion has a viscosity of at least 100,000 cP to no more than 300,000 cP, wherein said viscosity is measured with a Brookfield LV Viscometer at a constant spindle speed setting of 2.5 for a #25 spindle at 25° C.

30. The process for forming a PTFE mat of claim 19 wherein said dispersion has a viscosity of at least 100,000 cP to no more than 500,000 cP, wherein said viscosity is measured with a Brookfield LV Viscometer at a constant spindle speed setting of 2.5 for a #25 spindle at 25° C.

* * * * *